Dec. 8, 1964   J. ERDOS   3,159,852
MOBILE BED
Filed March 8, 1962   2 Sheets-Sheet 2
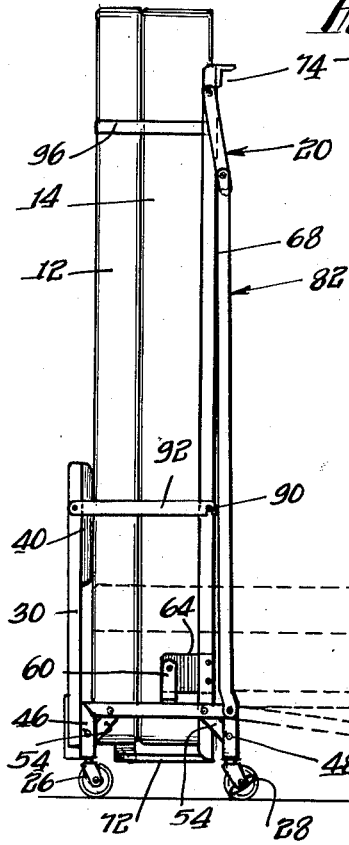
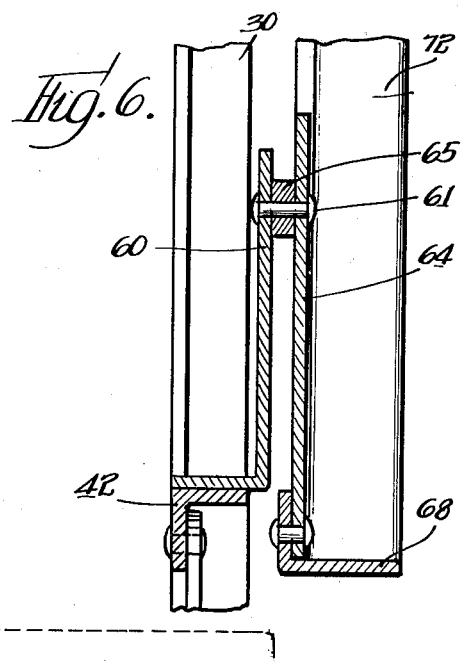
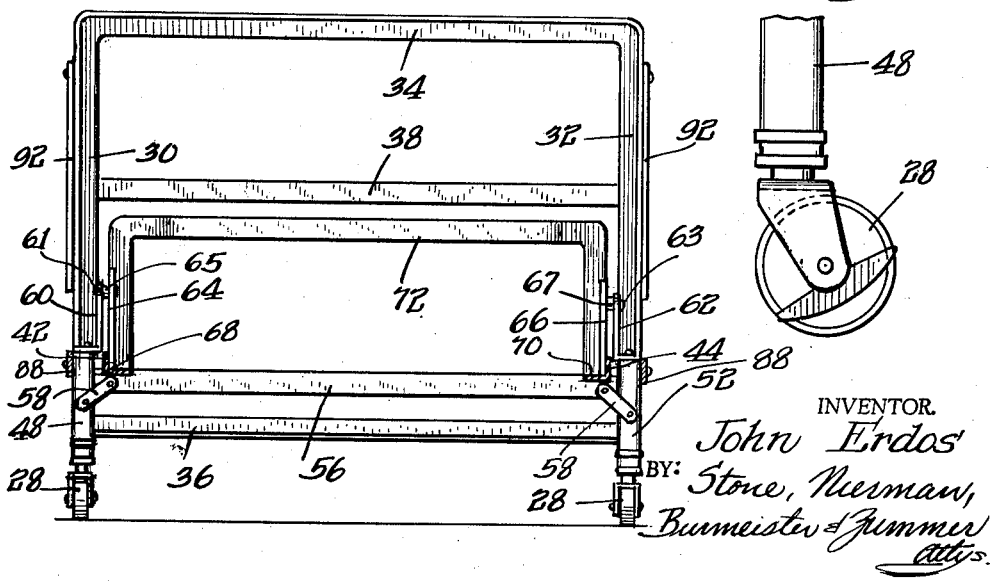
INVENTOR.
John Erdos
BY: Stone, Nierman,
Burmeister & Zimmer
Attys.

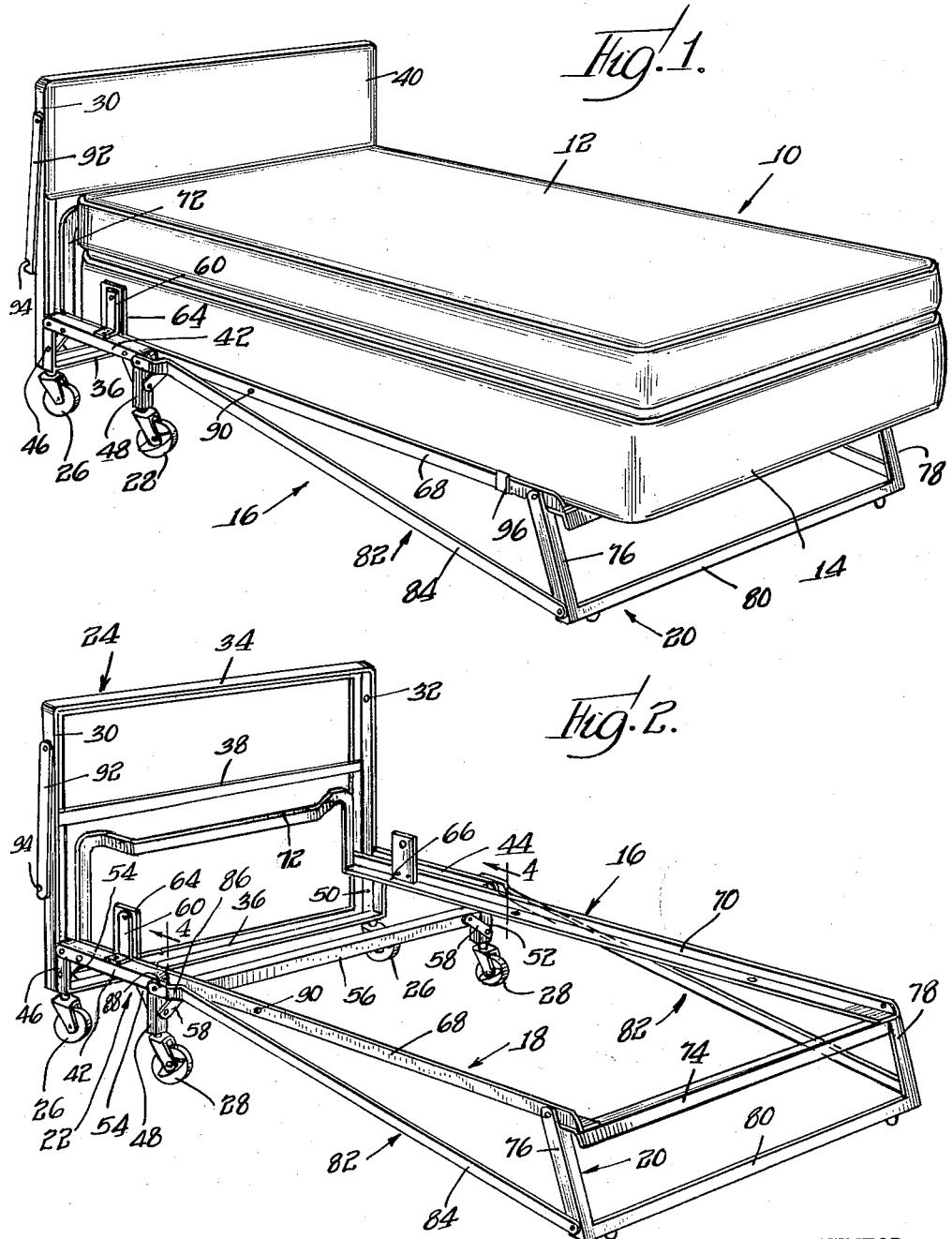

United States Patent Office 3,159,852
Patented Dec. 8, 1964

3,159,852
MOBILE BED
John Erdos, Chicago, Ill., assignor to Inland Bed Company, Cook County, Mich., a corporation of Illinois
Filed Mar. 8, 1962, Ser. No. 178,304
3 Claims. (Cl. 5—136)

This invention relates to improvements in the construction of a mobile bed and more particularly to the construction of a bed which may be stored in a small space and conveniently moved from one location to another.

It is the principal object of the present invention to provide a bed which is particularly suitable for use in hotels and motels as a so-called "extra" bed, having the general appearance and construction, and the sleeping comfort and ease of making-up, of the box-spring-and-mattress type frequently known as the "Hollywood," in place of the makeshift folding cots and similar relatively crude beds heretofore used for the purpose. The invention, as hereinafter will be seen, accomplishes this object in such a manner that the "emergency only" appearance and comfort of beds heretofore fully practical for such use have been largely eliminated, making the bed of the invention suitable for more general types of use, such as in small apartments.

It is a further object of the invention to provide a simple and economical construction for a mobile bed frame which may conveniently accept standard foam mattresses and box springs but still provide a portable bed which may be stored in a minimum of space.

Other objects and uses of the present invention will become readily apparent to those skilled in the art upon a perusal of the accompanying specification in light of the drawings in which:

FIGURE 1 is a perspective view of a bed embodying the invention;

FIGURE 2 is a perspective view of the frame of the bed shown in FIGURE 1;

FIGURE 3 is a side elevation of the bed shown in FIGURE 1 but with the bed shown in a vertical or storage attitude and, in dotted form, in a horizontal attitude suitable for use;

FIGURE 4 is a cross-sectional view taken on line 4—4 of FIGURE 2;

FIGURE 5 is a fragmentary detail view of a locking caster used with the present bed; and FIGURE 6 is a cross-sectional view of one of a pair of pivot supports showing the details of construction thereof.

Referring now to the drawings and especially to FIGURES 1 and 2, the bed 10 there shown generally includes a foam rubber or plastic mattress 12, a box spring 14 supporting the foam mattress, and a bed frame generally indicated by numeral 16 supporting the box spring, which is secured thereto by screws.

As may be seen in FIGURE 2, the bed frame 16 includes a mattress frame 18, a leg 20 pivotally attached to the foot of the mattress frame, a carriage frame 22 pivotally connected to the mattress frame proximate to the head thereof, a headboard frame 24 fixed to the carriage frame, and back and front pairs of casters 26 and 28, respectively, supporting the carriage frame. The front casters 28 are locking casters, which may be locked to hold the entire bed in a given position.

Considering now the specific construction of the bed frame 16, the headboard frame includes a generally U-shaped outer frame made of angle stock and consisting of a pair of vertical posts 30 and 32 joined by an integral head brace 34. The headboard frame also includes a lower brace 36 which is fixed to the lower ends of posts 30 and 32. A middle brace 38 is fixed to the posts 30 and 32 between the braces 34 and 36 to complete the headboard frame. A suitably upholstered panel 40 is fixed to the headboard frame on the upper portion thereof.

The carriage frame 22 which supports the headboard includes sides 42 and 44, both of which are made of angle stock, back and front legs 46 and 48 fixed to the side 42 and a pair of identical legs 50 and 52 fixed to the side 44. Gusset plates 54 are fixed to each of the legs and the respective sides to secure the legs in position. A front carriage member 56, also of angle stock, is fixed to legs 48 and 52 to complete the carriage frame. The front member 56 has a pair of gussets 58 fixed thereto and to the legs 48 and 52. The casters 26 and 28 are mounted on the bottom of legs 46 and 50 and legs 48 and 52, respectively. Mounted on the central portions of the respective sides 42 and 44 are upwardly extending pivot bars 60 and 62.

The mattress frame is pivotally connected to the carriage frame by means of a pair of upwardly extending anchor plates 64 and 66 affixed to the side members 68 and 70 near the back end thereof and pivotally secured to the pivot bars 60 and 62, respectively through pivot pins 61 and 63, which are vertically located at a height approximately corresponding to the weight-midpoint of the pivoted assembly, and are horizontally located at a point forward of the headboard by aproximately the vertical distance between the pivotal axis and the top of the mattress. A spacer 65 is positioned between bar 60 and plate 64 while an identical spacer 67 is positioned between bar 62 and plate 66. The spacers allow the side members to clear the respective bars when the bed is pivoted. An inverted U-shaped mattress guard or stop 72 is fixed to the back ends of the mattress frame sides 68 and 70, the horizontal portion being bent slightly forward. The front end of the mattress frame is formed by a cross-member 74.

The leg 20 includes a pair of uprights 76 and 78 which are pivotally attached to the mattress frame sides 68 and 70, respectively, and are connected by a cross member 80. The leg 20 is connected to the carriage frame 22 by a pair of identical leg bars or links 82. Each of the links includes a main portion 84 which is pivotally attached to the lower end of the leg 20 as shown in FIGURE 2 and an offset 86 bearing a short extension 88. The extension 88 is pivotally attached to the forward end of the carriage frame so that the leg 20 pivots about the mattress frame as the mattress frame pivots about the pivot bars 60 and 62.

In order to lock the mattress frame in a substantially vertical position as shown in FIGURE 3, a locking means is provided. Each of the mattress frame sides has a laterally extending locking stud 90. Pivotally attached to the headboard posts 30 and 32 is a pair of locking bars 92. Each of the locking bars 92 has a locking notch 94 in its free end for engagement with the locking studs 90 to hold the mattress frame in an upright position.

As may be seen in FIGURE 1, when the bed is in the condition of use, the box spring rests on the mattress frame sides 68 and 70, which are of upright L-shape cross-section, i.e., of angle stock, and are symmetrically opposed to form an upwardly facing channel-like seat for the box spring while the cross-member 74, also of angle stock, is inverted with respect to the side members to permit level extension of the forward end of the box spring. The mattress frame is supported at the foot end by leg 20. The head end of the mattress frame is supported on the carriage frame by means of the pivot pins 61 and 63. The casters 28 may be locked or unlocked, as desired, when the bed is in the condition for use.

To store or move the bed, the foot end of the frame is raised so that the mattress frame and the box spring and mattress pivot about the axis of rotation defined by the pivots 61 and 63, after securing the mattress to the box spring by a belt 96, which is of two-piece construction, having outer ends secured to the under edges of the box spring, and extending across mattress as shown in FIGURE 3 to hold the upper end of the entire pivoted assembly together as a unit by suitable mating belt-end fittings (not shown). As the mattress frame is pivoted about its axis of rotation, the leg 20 is automatically folded toward the mattress frame by the links 82. Locking of the casters during this raising of the bed permits this to be simply done by one person, even if the bed is in the middle of a room. When the mattress frame, with the mattress and box spring, attains a substantially vertical position as shown in solid form in FIGURE 3, the center of gravity of the combination of the mattress, box spring and mattress frame is in generally the same vertical plane as the axis of rotation of these portions of the bed. The latter, defined by the pivotal axis of plates 64 and 66 on bars 60 and 62, is very slightly forward of midway of the front and rear casters, this slight forward displacement of the center or gravity of the folding portion of the assembly approximately balancing the added load imposed on the rear casters by the headboard portion.

The lower portion of the mattress engages face 40 of the headboard to fix the position of the lower portion of the mattress and box-spring assembly. The mattress guard 72 engages the mattress to support it in register with the box-spring, and at stop against substantial overshooting of this substantially balanced position is provided by the abutment of the cross-member 80 of the leg 20 against the sides of the mattress frame, the stop thus provided being, however, very slightly past the point of exact balance of the pivoted assembly. As may be seen in the drawing, the front end of the carriage frame extends forward of the horizontal location of the pivotal mounting by slightly more than the height of the pivotal mounting above (in the condition of FIGURE 1) the mattress frame, and the leg bars or links 82 are of a length folding these links and the leg along the bottom of the frame in the vertical position of FIGURE 3.

In order to lock the mattress frame with the mattress and box-spring in a vertical attitude, the locking means is used. The locking bars 92 are pivoted about their respective posts and engage the locking studs 90 so that the pivoted assembly is then locked in the stable position just described, the stability being achieved without springs or counterweights adding to the cost or weight. The stability in this upright position permits the operation to perform the locking by means of bars 92 without meanwhile being obliged to hold the pivoted assembly upright.

With the mattress frame in a vertical attitude, the bed may be conveniently moved and stored. The locking casters 28 are released, and the even weight distribution on the casters produced as described above results in ability to move the folded bed readily from place to place, with minimum care, the wheeling of the bed over usual obstructions such as door thresholds, or even the production of slight tilt, requiring no great care in handling by one person. With the construction illustrated the bed takes up very little storage space, occupying only a little more floor space than the foam rubber mattress and box-spring themselves and substantially less than ordinary folding cots. The axis of rotation of the mattress frame is spaced from the plane of the headboard by an amount substantially equal to the height of the pivot from the floor less the diameter of the casters, so that the mattress frame is just above the height of the casters in the folded position, while leaving no gap at the headboard when unfolded. This construction allows the bed to be rolled through an ordinary doorway without the necessity of tipping or tilting, the overall height being only sufficiently greater than the length of the mattress and box-spring to provide clearance for doorsills or shallow steps or other similar obstacles. Further, it will be noted that the pivot point of the folding assembly must be as far from the back end of the side frame members as its height from the floor, to permit unobstructed motion in the folding and unfold operations. Since the bed is thin, it is easily manipulated around corners.

When it is desired to use the bed, it may again be transported, its casters locked, and then the pivoting portion unlocked and lowered in reversal of the operations previously described, all by one person who may easily perform each operation separately. When the mattress frame is in a horizontal position, it is necessary only to remove the belt from the mattress and the bed is ready for use, the general overall appearance and functional utility then being substantially similar to any non-portable construction, the headboard panel being suited to be upholstered in accordance with the general decor of the surroundings, and the bed being, particularly when covered with a typical "skirt-type" spread of the type often used with such bed constructions, visually closely similar to a bed of completely non-portable construction.

It will be observed that the use of a foam mattress is of great importance to the utility and practicality of the construction. In ordinary type of beds, foam and other types of mattresses are more or less interchangeable, the use of foam merely, in general, lowering the height of the sleeping surface because of the relatively small thickness of such mattresses. In the present case, however, not only is alteration of the bed construction required if an ordinary thick mattress is used, but the storage area required is increased, and the achievement of comparable stability becomes more difficult to achieve. In addition to the diminished weight and size where foam is used, the center of gravity in the folded condition is substantially lower. With a typical foam mattress, the total thickness of the spring and mattress is less than 14 inches.

Although a specific embodiment of the invention has been shown and described in detail herein, those skilled in the art may make various modifications and changes without departing from the spirit and scope of the present invention. It will thus be understood that the scope of the protection to be given the invention should be limited only by the appended claims.

What is claimed is:

1. A mobile bed comprising, in combination:
   (a) a caster-mounted carriage frame having a headboard secured to the rearward end thereof,
   (b) a support frame pivotally mounted on the carriage frame,
   (c) a box spring and a foam mattress on the support frame and forming a movable assembly therewith,
   (d) said pivotal mounting comprising members extending upwardly from the carriage frame and the support frame and pivotally connected at approximately the weight-midpoint of the movable assembly and being forward of the headboard by approximately the vertical distance between the pivotal mounting and the top of the mattress,
   (e) leg members pivotally mounted at the front end of the support frame,
   (f) and unitary link members having rearward ends pivotally attached to the carriage frame and forward ends pivotally attached to the leg members, (g) the front end of the carriage frame being horizontally forward of the horizontal position of the pivotal mounting by approximately the height of the pivotal mounting above the mattress frame, (h) the link members and the leg members folding substantially against the support frame in the vertical position of the movable assembly.

2. The mobile bed of claim 1 having:

(j) the support frame comprising side and bottom angle-stock members, the side members being opposed to form an upwardly facing channel receiving the box spring and the bottom member being inverted with respect to the side members to pass the lower end of the box spring and having in fixed position thereon a mattress stop engaging the rearward end of the mattress.

3. The mobile bed of claim 2 having latching means selectively securing and releasing the movable assembly in the vertical position, and selectively operable means to secure and release the forward portion of the mattress to and from the box spring.

References Cited by the Examiner
UNITED STATES PATENTS

| | | | |
|---|---|---|---|
| 659,131 | 10/00 | Burgett | 2—136 X |
| 956,339 | 4/10 | Haley | 5—133 |
| 1,344,450 | 6/20 | McAllaster | 5—322 |
| 1,665,668 | 4/28 | Lofman | 5—162 X |
| 1,810,516 | 6/31 | Duvall | 5—162 X |
| 2,736,042 | 2/56 | Parrish | 5—131 |

FOREIGN PATENTS 379,855   9/07   France.

FRANK B. SHERRY, *Primary Examiner.*

UNITED STATES PATENT OFFICE
CERTIFICATE OF CORRECTION

Patent No. 3,159,852                                    December 8, 1964

John Erdos

It is hereby certified that error appears in the above numbered patent requiring correction and that the said Letters Patent should read as corrected below.

In the grant, line 2, for "Cook County, Michigan" read -- Cook County, Illinois --; in the heading to the printed specification, line 4, for "Cook County, Mich." read -- Cook County, Ill. --; column 3, line 42, for "at stop" read -- a stop --.

Signed and sealed this 18th day of May 1965.

(SEAL)
Attest:

ERNEST W. SWIDER
Attesting Officer

EDWARD J. BRENNER
Commissioner of Patents